US011562597B1

United States Patent
Kim

(10) Patent No.: US 11,562,597 B1
(45) Date of Patent: Jan. 24, 2023

(54) VISUAL DUBBING USING SYNTHETIC MODELS

(71) Applicant: Flawless Holdings Limited, London (GB)

(72) Inventor: Hyeongwoo Kim, London (GB)

(73) Assignee: Flawless Holdings Limited, London (GB)

( * ) Notice: Subject to any disclaimer, the term of this patent is extended or adjusted under 35 U.S.C. 154(b) by 0 days.

(21) Appl. No.: 17/846,997

(22) Filed: Jun. 22, 2022

(51) Int. Cl.
  *G06V 40/10* (2022.01)
  *G06V 40/16* (2022.01)
  *G06T 17/00* (2006.01)
  *G06N 3/04* (2006.01)
  *G06V 10/82* (2022.01)

(52) U.S. Cl.
  CPC ......... *G06V 40/176* (2022.01); *G06N 3/0454* (2013.01); *G06T 17/00* (2013.01); *G06V 10/82* (2022.01)

(58) Field of Classification Search
  CPC .... G06V 40/176; G06V 10/82; G06N 3/0454; G06T 17/00
  See application file for complete search history.

(56) References Cited

U.S. PATENT DOCUMENTS 11,398,255 B1 * 7/2022 Mann ............... G06V 10/774
2022/0035961 A1 * 2/2022 Ziabari ............. G06F 30/10

FOREIGN PATENT DOCUMENTS

DE 102021119857 A1 * 3/2022 ........... G06N 3/0454

OTHER PUBLICATIONS

Chung, Joon Son, Amir Jamaludin, and Andrew Zisserman. "You said that?." arXiv preprint arXiv: 1705.02966 (2017). (Year: 2017).*
Jamaludin, Amir, Joon Son Chung, and Andrew Zisserman. "You said that?: Synthesising talking faces from audio." International Journal of Computer Vision 127.11 (2019): 1767-1779. (Year: 2019).*
Yang, Yi, et al. "Large-scale multilingual audio visual dubbing." arXiv preprint arXiv:2011.03530 (2020). (Year: 2020).*
Garrido et al: Reconstruction of Personalized 30 Face Rigs from Monocular Video™ ACM Transactions on Graphics, Sep. 2015.
(Continued)

*Primary Examiner* — Fayyaz Alam
(74) *Attorney, Agent, or Firm* — EIP US LLP

(57) ABSTRACT

A computer-implemented method of processing target footage of a target human face includes training an encoder-decoder network comprising an encoder network, a first decoder network, and a second decoder network. The training includes training a first path through the encoder-decoder network including the encoder network and the first decoder network to reconstruct the target footage of the target human face, and training a second path through the encoder-decoder network including the encoder network and the second decoder network to process renders of a synthetic face model exhibiting a range of poses and expressions to determine parameter values for the synthetic face model corresponding to the range of poses and expressions. The method includes processing, using a trained network path comprising or trained using the encoder network and comprising the first decoder network, source data representing the synthetic face model exhibiting a source sequence of expressions, to generate output video data.

18 Claims, 11 Drawing Sheets

(56) References Cited

OTHER PUBLICATIONS

Fewari et al: "High-Fidelity Monocular Face Reconstruction based on an Unsupervised Model-based Face Autoencoder" IEEE Transactions On Pattern Analysis and Machine Intelligence, 2018.
Kim et al: "Neural Style-Preserving Visual Dubbing" Cornell University, Sep. 5, 2019.
Kim et al: "Deep Video Portraits" Cornell University, May 29, 2018.
Royer et al.: "XGAN: Unsupervised Image-to-Image Translation for Many-to-Many Mappings", arXiv: 1711.05139, Nov. 14, 2017.

* cited by examiner

VISUAL DUBBING USING SYNTHETIC MODELS

BACKGROUND OF THE INVENTION

Field of the Invention

The present invention relates to controlling expressions of human faces appearing in video. The invention has particular, but not exclusive, relevance to visual dubbing of foreign language feature films.

Description of the Related Technology

The production of live action feature films (filmmaking) is a time-consuming and expensive process, and typically requires the involvement of a large number of skilled professionals performing a large number of interdependent tasks subject to strict constraints on time and resources. A typical filmmaking process involves a production phase spread over multiple shoots, in which raw video footage is captured (along with audio) for multiple takes of each scene of the film, typically by multiple cameras and potentially in various video formats. A post-production phase then takes place, including an offline edit in which the raw footage is copied and compressed before selected portions are assembled by an editor and/or director to generate an offline edit. Sections of the raw video footage corresponding to the offline edit are then obtained, and visual effects (VFX) are applied where necessary whilst the audio is mixed, edited, and rerecorded if necessary. The resulting footage and audio are then subject to a finishing stage in which additional processes, such as color grading, may be applied before the master copy of the film is delivered.

The high cost and interdependence of tasks involved in the filmmaking process, along with the typical time constraints and variability of factors such as weather and availability of actors, mean that it is rarely feasible to reshoot scenes of a film. The film must therefore be constructed from the footage generated during the initial production phase, with VFX applied where appropriate. The production phase typically generates hundreds of hours of high-resolution raw video footage, only a small fraction of which is ultimately used in the film. The raw footage may not capture the desired combination of actor performance(s) and conditions such as weather, backdrop, lighting etc., the latter of which can be modified only to a limited extent during the VFX and finishing stages.

When the filmmaking process is complete, the master copy of the film is delivered for screening in cinemas, on streaming services, on television, and so on. For some films, foreign language versions may be produced in parallel with the original film, for delivery at the same time as the original film. Foreign language versions of a film typically use text subtitles or audio dubbing to reproduce dialogue in a desired language. In either of these cases, it is generally accepted that the foreign language version of the film loses much of the nuance and quality of the original film.

In recent years, methods have been proposed in which neural networks models are used to render photo-realistic instances of a target actor's face with expressions and mouth movements derived from footage of a foreign language actor, effectively enabling visual dubbing of foreign language films. Known approaches can broadly be classified as either (i) two-dimensional methods (commonly referred to as deep fakes) in which a generative adversarial network (GAN) or similar model is used to generate a visually dubbed output based directly on the footage of the source actor and target actor, or (ii) three-dimensional methods in which a three-dimensional model of the target actor's face is modified using the source footage and then coupled to a neural renderer which renders a visually dubbed output based on the modified three-dimensional model.

Both approaches are capable of generating plausible dubbed outputs, but each has its own drawbacks. In particular, for two-dimensional methods, the "black box" nature of the neural network model prohibits control over the output, making it challenging to tweak or modify the resulting video data as may be desirable to achieve plausible and seamless visual dubbing in the context of a film. By contrast, three-dimensional methods enable a greater level of control over the output via adjustable parameters of the three-dimensional model, but require precise tracking of facial landmarks, followed by three-dimensional model fitting, for the target actor's face at training time and for the foreign language actor's face at test time. These can be resource-intensive and error-prone processes, and currently represent a significant bottleneck in the visual dubbing pipeline.

SUMMARY

According to a first aspect, there is provided a computer-implemented method of processing input video data comprising target footage of a target human face. The method includes training an encoder-decoder network comprising an encoder network, a first decoder network, and a second decoder network, where the training includes: training a first path through the encoder-decoder network to reconstruct the target footage of the target human face, the first path comprising the encoder network and the first decoder network; and training a second path through the encoder-decoder network to process renderings of a synthetic face model exhibiting a range of poses and expressions to determine parameter values for the synthetic face model corresponding to the range of poses and expressions, the second path comprising the encoder network and the second decoder network. The method further includes processing, using a trained network path comprising or trained using the encoder network and comprising the first decoder network, source data representing the synthetic face model exhibiting a source sequence of expressions, to generate output video data in which the target human face exhibits the source sequence of expressions.

By including the same encoder network in both paths through the encoder-decoder network, the encoder network is forced to learn a representation which captures common facial characteristics of the target human face and the synthetic face model. This enables the trained network path to transfer the source sequence of expressions from the synthetic face model to the target human face, without needing to track the target human face or perform synthetic face model fitting.

The trained network path may be the trained first path through the encoder-decoder network, in which case the source data may be a rendering of the synthetic face model exhibiting the source sequence of expressions. Alternatively, the source data may be a set of parameter values for the synthetic face model corresponding to the source sequence of expressions. The method may then include training a mapping network to map sets of parameter values for the synthetic face model to data arrays generated by the encoder network processing corresponding footage of the synthetic face model. The trained network path may then include the mapping network and the first decoder network. This alternative method provides direct control over expressions exhibited by the target human face via the parameter values of the synthetic face model, without the need for intermediate rendering of the synthetic face model.

The method may include processing source footage of a source human face to generate the source data. For example, the target footage may represent a first actor speaking in a first language and the source footage may represent a second actor speaking in a second language different from the first language, in which case source data generated from the source footage may be used to generate a visual dub in which the first actor speaks in the second language.

In an example, the encoder-decoder network includes a third decoder network, the training comprises training a third path through the encoder-decoder network to reconstruct footage of the source human face, the third path comprising the encoder network and the third decoder network. Processing the source footage may then use the trained second path through the encoder-decoder network. In this way, the encoder network is forced to learn a representation which captures common facial characteristics of the source human face, the target human face, and the synthetic face model. The third path through the network can then be used to transfer sequences of expressions from the source human face to parameter values of the synthetic face model, without needing to track the source human face or perform model fitting.

In another example, the encoder network is a first encoder network, and the encoder-decoder network comprises a second encoder network and a third decoder network. The training then includes training a third path through the encoder-decoder network to reconstruct footage of the source human face, the third path comprising the second encoder network and the third decoder network, and training a fourth path through the encoder-decoder network to reconstruct footage of the synthetic face model exhibiting a range of poses and expressions, the fourth path comprising the second encoder network and the second decoder network. Processing the source footage of the source human face then uses the trained fourth path through the encoder-decoder network. This alternative implementation similarly enables sequences of expressions to be transferred from the source human face to parameter values of the synthetic face model without needing to track the source human face or perform model fitting.

Generating the source data may include processing the source footage of the source human face to determine intermediate parameter values for the synthetic face model representing an intermediate sequence of expressions, and adjusting the intermediate parameter values to generate the source data. The ability to control the source data via the parameters of the synthetic face model is one of the primary benefits of three-dimensional methods over two-dimensional methods, but in contrast with other three-dimensional methods, may be achieved in the present example without the need for face tracking or model fitting.

Adjusting the intermediate parameter values may include progressively interpolating between the intermediate parameter values and parameter values corresponding to the target footage of the target human face. The target face may then be made to progressively transition between the original expressions and the intermediate expressions in a smooth and seamless fashion. Furthermore, the deviation of the original expressions can be ramped up and down to provide enable continuous deep editing.

The method may include obtaining the footage of the synthetic face model exhibiting the range of poses and expressions by rendering the synthetic face model based on the parameter values corresponding to the range of poses and expressions. The range of poses and expressions may be sampled, for example randomly or using a predetermined space-filling design to cover relevant regions of a parameter space representing poses and expressions. By covering the relevant regions of the parameter space in an efficient and comprehensive manner (for example, approximately uniformly), the encoder network may be provided with a range of opportunities to correlate features of the synthetic face model with features of the target human face, ultimately enabling a more faithful transferring of expressions from the synthetic face model to the target human face.

Training the first path through the encoder-decoder network may use an adversarial loss and a video reconstruction loss. In this way, the first path is encouraged to generate candidate reconstructions which are, but which also have visual characteristics consistent with those of the target footage. Training the second path through the encoder-decoder network may use a parameter reconstruction loss, which may result in a less challenging optimization surface compared with an image-based loss.

The method may include processing the input video data using a face detector to detect instances of the target human face, determining a framewise location of each of the detected instances of the target human face, and isolating the target footage from the input video data based on the determined framewise locations of the detected instances of the target human face. The method may then include replacing at least part of a first instance of the target human face detected in the input video data with at least part of the target human face appearing in the output video data. In this way, the method may be used to automatically replace instances of the target face, for example in the context of a feature film where visual dubbing may be performed for every speaking instance of every actor in the film.

According to a second aspect, there is provided a system comprising one or more processors and one or more non-transient storage media storing machine readable instructions which, when executed by the one or more processors, cause the one or more processors to carry out any of the above methods.

According to a third aspect, there are provided one or more non-transient storage media storing machine readable instructions which, when executed by one or more processors, cause the one or more processors to carry out any of the above methods.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further noted that certain examples are described schematically with certain features omitted and/or necessarily simplified for the ease of explanation and understanding of the concepts underlying the examples.

Embodiments of the present disclosure relate to controlling or modifying expressions of human faces in film. In the present disclosure, film may refer to any form of digital video data or audio-visual product. In particular, embodiments described herein address issues related to the efficiency and flexibility of existing neural network-based methods of modifying expressions of human faces. The technology disclosed herein is relevant to tasks such as visual dubbing of foreign language films, performance amplification and blending, and performance transposition between film scenes.

Figure 1:
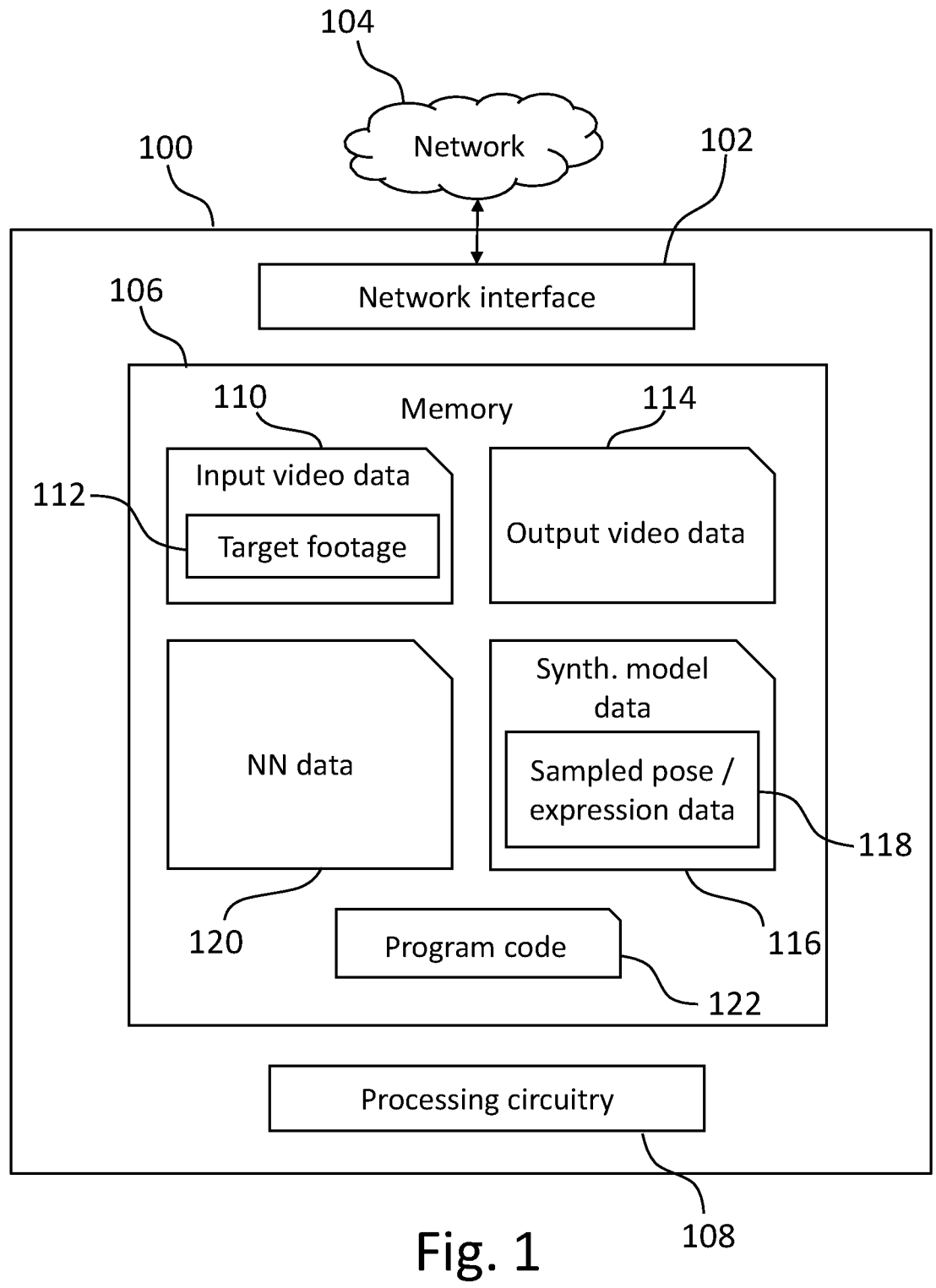
FIG. 1 shows schematically a data processing system arranged in accordance with examples.

FIG. 1 schematically shows a data processing system 100 in accordance with examples. The data processing system 100 includes a network interface 102 for communicating with remote devices over a network 104. The data processing system 100 may be a single device such as a server computer or may include multiple devices, for example multiple server computers connected via a network. The data processing system 100 includes memory 106, which in the present disclosure refers both to non-volatile storage and to volatile and non-volatile working memory. The memory 106 is communicatively coupled to processing circuitry 108, which may include any number of processing units such as central processing units (CPUs), graphics processing units (GPUs), neural processing units (NPUs) or neural network accelerators (NNAs), application specific integrated circuits (ASICs), digital signal processors (DSPs), and so on.

The memory 106 is arranged to store various types of data for implementing the methods described hereinafter. In particular, the memory 106 may store input video data 110 comprising sequences of image frames, where a sequence of image frames may correspond to raw and/or processed video footage captured by one or more cameras. The input video data 110 may for example include picture rushes captured during a production of a film, and/or may include compressed or otherwise processed footage.

The input video data 110 may include target footage 112 of a target human face. The target human face may be a face appearing in the input video data whose expression is to be modified within at least some image frames of the input video data, for example as part of a visual dubbing process. The target footage 112 may include one or more instances of the target human face, where in the present disclosure an instance of a face broadly refers to an uninterrupted appearance of the face within a sequence of image frames. For example, in a given scene of a film, a given face may appear within a first sequence of image frames, then may be occluded or move outside the field of view of the camera for a second sequence of image frames, then reappear later in a third sequence of image frames, in which case two instances of the face would be recorded. The target footage 112 may therefore include one or more sequences of image frames, or portions of image frames defined by bounding boxes which may be resized, rotated and/or stabilized as will be described in more detail hereinafter. The target footage 112 may be identified by metadata such as timestamps indicating in which frames of the input video data 110 instances of the target face appear, along with metadata indicating a framewise position, scale, and/or orientation of each instance of the target face. The memory 106 may also store output video data 114, resulting from the application of methods described herein.

The memory 106 may further stores synthetic model data 116 encoding a three-dimensional synthetic model representing a human face. The identity of the face represented by the synthetic model does not necessarily correspond to the target face, and the same synthetic model may be suitable for use with a range of target faces. In some examples, a synthetic model of a face is chosen which is visually similar to the target face, which may improve the quality of output generated by the methods described herein. In other examples, the synthetic model may be entirely generic and independent of the identity of any target face, such that the same face model can be used with any target face. The pose and facial expression of the synthetic model are controllable using a set of adjustable parameters, enabling the synthetic model to be animated by adjusting the values of the parameters. The animated synthetic model may be rendered, for example using rasterization and/or raycasting methods, resulting in video data comprising sequences of synthetic image frames in which the synthetic model can exhibit various poses and facial expressions.

The synthetic model may be a dense model such a three-dimensional morphable model, and may consist of a mesh model formed of polygons such as triangles and/or quadrilaterals each having respective edges and vertices. The synthetic model may be parameterized by a set of fixed parameters and a set of variable parameters, where the fixed parameters encode characteristics of the face which, for the purposes of the present disclosure, can be assumed not to vary between image frames, and the variable parameters encode characteristics which may vary between image frames. The fixed parameters may encode a base geometry or identity of the face (for example, a geometry of the face with a neutral expression), which may be treated a starting point to which deformations can be applied. The base geometry may specify, for example, positions of vertices of a mesh model. The fixed parameters may also encode a reflectance model and/or other surface characteristics of the face, along with a lighting model characterizing the irradiance of the model at a given point. The combination of the reflectance model and lighting model may enable the irradiance at a given point on the surface of the face to be determined. For example, the reflectance model may be a Lambertian reflectance model which treats the surface of the model as a perfect diffuse surface that scatters incident illumination equally in all directions. The lighting model may model the illumination at a given point on the surface of the model using a predetermined number of spherical harmonic basis functions (for example, the first three bands L0, L1, L2 of spherical harmonic basis functions).

The variable parameters of the synthetic model may include pose parameters encoding a position and/or orientation of the model with respect to a virtual camera, and deformation parameters for example encoding adjustments applied to the base geometry of the model, thereby causing the model to exhibit different facial expressions, mouth movements, and so on. The pose parameters may encode a position of the model in three-dimensions and rigid rotations about three axes (i.e. Euler angles), or in other words may include six degrees of freedom, though this is not essential. The deformation parameters may directly control deformations applied to respective vertices of a mesh model, or may control weightings of a linear combination of blendshapes, where each blendshape corresponds to a specific global deformation of the base geometry. Alternatively, the deformation parameters may control weightings for a linear combination of delta blendshapes, where each delta blendshape corresponds to a deformation over a specific subset of vertices. By specifying particular weightings, the linear combination of blendshapes or delta blendshapes may be capable of expressing a wide range of deformations to the base geometry, resulting in a wide range of facial expressions for the synthetic model. It is stressed that these implementation details for the synthetic model are by way of example only, and other parameterizations and synthetic model definitions are possible. For example, three-dimensional synthetic models of humans, sometimes referred to as metahumans, have been developed for use as avatars in the metaverse. Commercial software packages have been developed for generating high-fidelity controllable three-dimensional synthetic models of human faces, such as MetaHuman Creator® by Epic Games®.

The synthetic model data 116 may include sampled pose/expression data 118, including specific parameter values corresponding to a range of poses and expressions for the synthetic model. The sampled pose/expression data 188 may for example include parameter values corresponding to several minutes or hours of animation of the synthetic model. The range of poses and expressions may be sampled using any suitable strategy, for example randomly or based on a predetermined space-filling design to ensure relevant regions of the parameter space for poses and expressions are covered in an efficient manner. The sampled poses and expressions may be independent of the poses and expressions exhibited by the target face in the target footage, though it may be desirable for the sampled poses and expressions to include poses and expressions bearing similarities to those exhibited by the target face. More generally, it is desirable for the sampled poses and expressions to represent realistic movements of a human face. As will be explained in more detail hereinafter, the sampled pose/expression data 118 is used for training a neural network model. Because it is not necessary for the sampled poses and expressions to match poses and expressions exhibited by the target face, it is not necessary to track the target face or to perform model fitting during training of the neural network model, which represents a significant benefit of the present method over existing three-dimensional methods.

The memory 106 further stores neural network data 120 corresponding to one or more neural network models, including but not limited to one or more encoder-decoder networks for implementing methods as described hereinafter. The neural network data 120 may define all aspects of the neural network models required for training and subsequent processing of data by the neural network models. The neural network data 120 may for example encode network architectures, hyperparameter values, trainable parameter values, training routines, definitions of training objectives, and so on. Details of neural network models for implementing methods in accordance with the present disclosure are provided in detail hereinafter.

The memory 106 may further stores program code 122 comprising routines for implementing the computer-implemented methods described herein. The routines may enable completely automated implementations of the computer-implemented methods, and/or may enable user input to control various aspects of the processing. The program code 122 may for example define a software tool to enable users to perform deep editing of objects in video data.

Figure 2A:
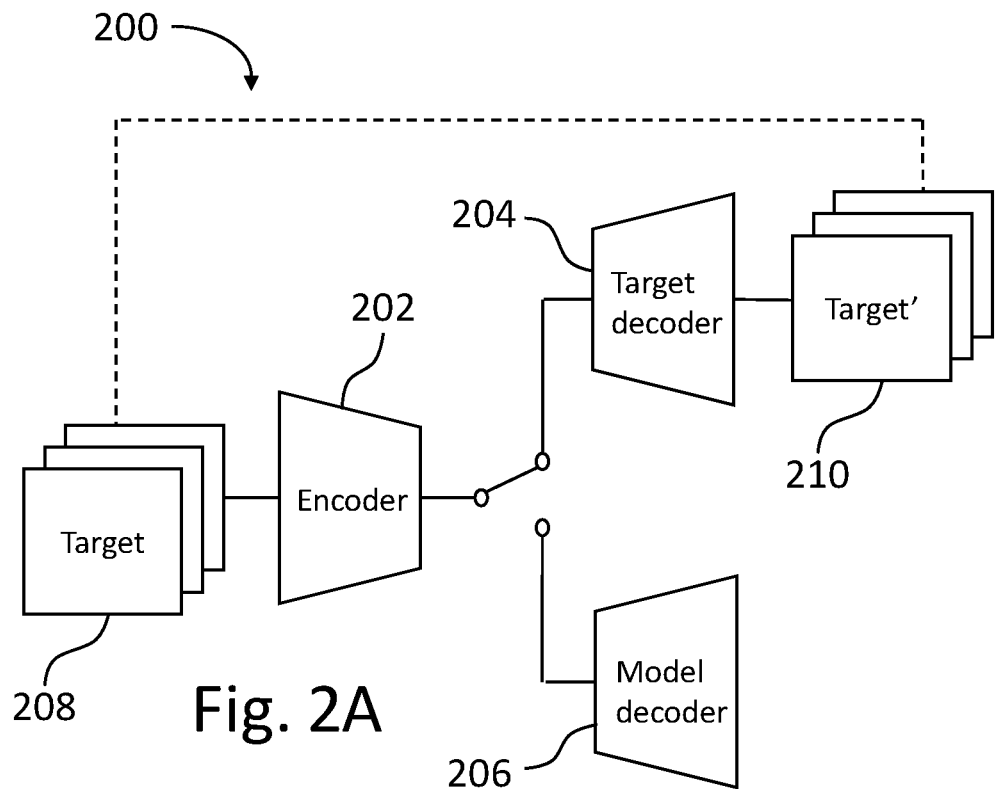
FIGS. 2A and 2B show schematically an example of training a first encoder-decoder network.
Figure 2B:
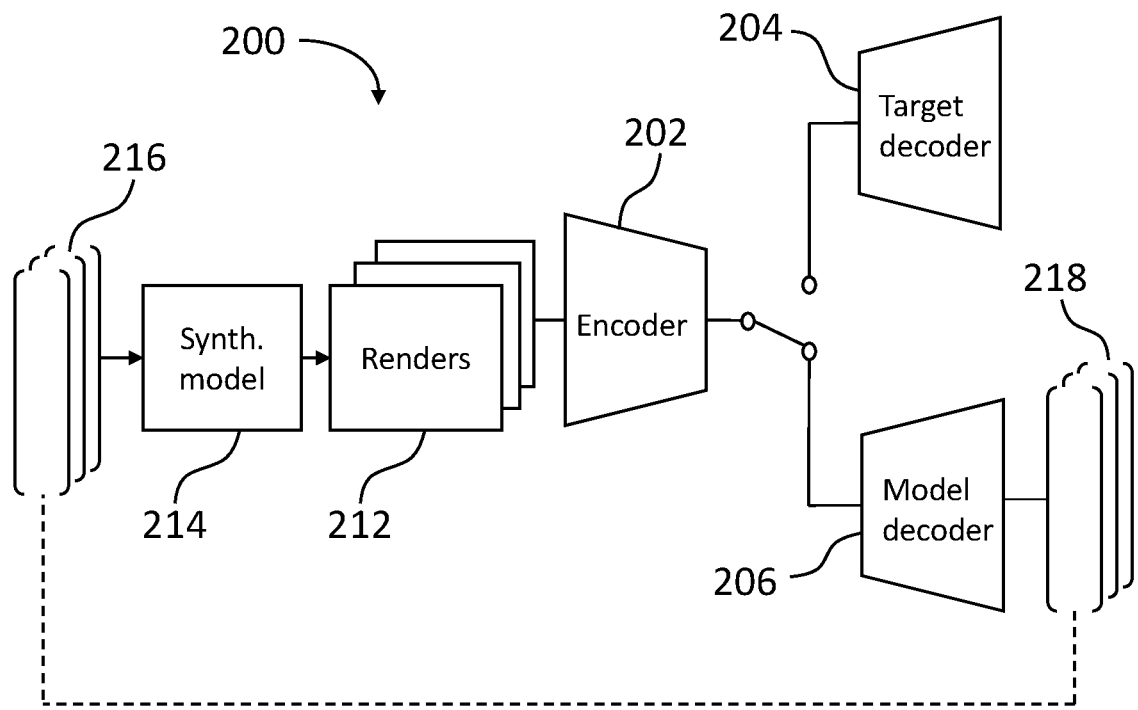

FIGS. 2A and 2B show an example of an encoder-decoder network 200 comprising an encoder network 202, a target decoder network 204, and a model decoder 206. In FIGS. 2A and 2B, and the figures which follow, solid undirected lines between network components represent differentiable network paths through which backpropagation is possible, whereas arrows represent data flows which are not necessarily differentiable. For example, the methods described herein do not rely on the process of rendering a synthetic model being differentiable, and therefore the connection in FIG. 2B between the synthetic face model 214 and renderings 212 of the synthetic face model 214 is shown with an arrow.

An encoder-decoder network within the meaning of the present disclosure may be a neural network including one or more encoder networks and one or more decoder networks, in which various paths through the neural network may be defined by selecting various combinations of encoder network and decoder network. In the example of FIGS. 2A and 2B, a first path through the encoder-decoder network 200 is defined by coupling the encoder network 202 to the target decoder network 204 (as shown in FIG. 2A), and a second path through the encoder-decoder network 200 is defined by coupling the encoder network 202 to the model decoder 206 (as shown in FIG. 2B).

The encoder network 202 is arranged to process image frames to generate latent data arrays. The encoder network 202 may for example be arranged to process image frames on an individual basis such that a single latent data array is derived from each image frame process. Alternatively, the encoder network 202 may be arranged to capture inter-frame dependencies, such that the encoder network 202 is capable of capturing dynamic characteristics, for example relating to the motion of a face as opposed to simply static expressions of the face, which may help the encoder network 202 to more faithfully represent footage of the face. For example, to generate a single latent data array the encoder network 202 may apply a "moving window" to process space-time volumes each comprising a predetermined number of consecutive image frames (for example, 1, 2, 5, 10 or any other suitable number of image frames), such that each latent data array is derived from data spanning a respective temporal interval. The encoder network 202 may for example include several downsampling components which may each reduce the resolution of their input. A given downsampling component may include at least a convolutional filter and a nonlinear activation function. At least some components of the encoder network 202 may utilize batch normalization and/or dropout during training. In a specific example, a given downsampling component employs a 4×4 convolutional layer at stride 2 followed by batch normalization, dropout, and a leaky ReLU activation function. It will be appreciated that other architectures are possible for the encoder network 202, and the present architecture is provided by means of example only. In other examples, the encoder network 202 may be configured to process image frames in a sequential manner, for example in the manner of a recurrent neural network (RNN) such as a long short-term memory (LSTM) network. Alternatively, the encoder network 202 may be implemented as a transformer, or as any other suitable network architecture capable of processing sequences of image frames to generate latent data arrays.

The latent data arrays generated by the encoder network 202 may be vectors or any other arrangement of elements. The latent data arrays may be composed of significantly fewer elements (for example tens, hundreds, or thousands of elements) than the number of pixels (for example hundreds of thousands or millions of pixels) in the image frames processed by the encoder network 202. In this way, the encoder network 202 is encouraged to learn compact representations which efficiently encode characteristics or features that vary between image frames, whilst remaining relatively agnostic to characteristics or features which are common to the image frames.

The target decoder network 204 is arranged to process latent data arrays generated by the encoder network 202 to generate output images. The target decoder network 204 may be any suitable neural network model capable of generating image frames from latent data arrays. The target decoder network 204 may be configured to output a single image frame for each latent data array received from the encoder network 202, irrespective of how may input image frames to generate the latent data array. Alternatively, the target decoder network 204 may be configured to output multiple image frames from each latent data array. The target decoder network 204 may for example include several upsampling components which may each increase the resolution of their input. A given upsampling component may include a deconvolutional filter and a nonlinear activation function, along with optionally other layers or filters. At least some components of the target decoder network 204 may utilize batch normalization and/or dropout during training. In a specific example, a given upsampling component utilizes a cascaded refinement strategy and employs a 4×4 deconvolutional filter at stride 2, followed by batch normalization, dropout and a ReLU activation function, followed by two 3×3 convolutional filters at stride 1 each followed by a further ReLU activation function. It will be appreciated that other architectures are possible for the target decoder network 204, and the present architecture is provided by means of example only. Other implementations of the target decoder network 204 may be based on neural radiance fields (NeRFs), StyleGAN or other GAN architectures.

The model decoder network 206 is arranged to process latent data arrays generated by the encoder network 202 to generate sets of parameter values for a synthetic face model. The generated sets of parameter values may correspond to variable parameters of the synthetic face model, such as those encoding facial expression and pose as discussed above. For each latent data array received from the encoder network 202, the model decoder network 206 may be configured to output a single set of parameter values, corresponding to a single expression and pose of the synthetic model, irrespective of how may input image frames to generate the latent data array. Alternatively, the model decoder network 206 may be configured to output multiple sets of parameter values from each latent data array. In some implementations, the model decoder network 206 may additionally be arranged to output image frames in a similar manner to the target decoder network 204, in which case the model decoder network 206 may include separate outputs for outputting image frames and sets of parameter values.

As shown in FIG. 2A, the first path through the encoder-decoder network 200 (comprising the encoder network 202 and the target decoder network 204) may be trained to reconstruct target footage 208 of a target human face. The target footage 208 may include one or more sequences of image frames corresponding to respective instances of the target human face, and may last for several minutes or several hours in its entirety. The first path through the encoder-decoder network 200 may be adversarially trained to reconstruct the target footage 208. For example, a discriminator network (not shown) may be employed which takes the same input as the encoder network 202, along with either one or more image frames of a candidate reconstruction 210 of the target footage 208 or a corresponding one or more frames of the target footage 208 (which may be considered "ground truth" in this context). The discriminator network attempts to predict whether it has received image frames from the candidate reconstruction 210 or the ground truth target footage. An adversarial loss is determined which rewards the discriminator network for making correct predictions and rewards the encoder network 202 and target decoder network 204 for causing the discriminator network to make incorrect predictions. Backpropagation may then be used to determine a gradient of the adversarial loss with respect to parameters of the encoder network 202, the target decoder network 204, and the discriminator network, and the parameter values of the encoder network 202, the target decoder network 204, and the discriminator network are updated in dependence on the determined gradient of the adversarial loss, for example using stochastic gradient descent or a variant thereof. The adversarial loss may be supplemented or replaced with one or more further losses such as a photometric loss or perceptual loss which penalizes differences between image features of the candidate reconstruction 210 and image frames of the target footage 208. Suitable losses include L1 loss, L2 loss, structured similarity (SSIM) loss, Fréchet inception distance (FID), any variant thereof, or any other suitable metric for comparing a distance between image frames of the candidate reconstruction 210 and corresponding image frames of the target footage 208.

By combining an adversarial loss with a photometric and/or perceptual loss, the encoder network 202 and the target decoder network 204 can learn to candidate reconstructions 210 which are both photometrically and/or perceptually alike to the target footage 208 and stylistically indistinguishable from the target footage 208, meaning that the resulting reconstructions preserve idiosyncrasies of the target footage 208. Nevertheless, alternative approaches are possible for training the first path through the encoder-decoder network 200 to reconstruct the target footage of the target human face, for example based on different types of discriminator network, without departing from the scope of the present disclosure.

As shown in FIG. 2B, the second path through the encoder-decoder network 200 (comprising the encoder network 202 and the model decoder network 206) may be trained to process two-dimensional renders 212 of a three-dimensional synthetic face model 214 exhibiting a range of poses and expressions, to determine corresponding sets of parameter values 216 for the synthetic face model 214. The renders 212 may last for several minutes or several hours, and the poses and/or expressions may be sampled to as discussed above to ensure appropriate coverage of the corresponding parameter space.

In order to train the second path through the encoder-decoder network 200, the synthetic face model 214 may be rendered using the sets of parameter values 216 to generate the two-dimensional renders 212. The generated renders 212 may be processed by the encoder network 202 followed by the model decoder network 206 to generate candidate reconstructions 218 of the sets of parameter values 216. The second path through the encoder-decoder network 200 may be trained using a parameter reconstruction loss which measures a metric distance between the ground truth sets of parameter values 216 and the candidate reconstructions 218. The parameter reconstruction loss may be based on an L1 loss, and L2 loss, or any other suitable metric. Backpropagation may be used to determine a gradient of the parameter reconstruction loss with respect to parameters of the encoder network 202 and the model decoder network 206, and the parameter values of the encoder network 202, and the model decoder network 206 may be updated in dependence on the determined gradient of the parameter reconstruction loss, for example using stochastic gradient descent or a variant thereof. In some implementations, the second path through the encoder network 200 may additionally, or alternatively, be adversarially trained using a further discriminator network. For implementations in which the model decoder network 206 is arranged to output image frames alongside sets of parameter values for the synthetic model, additional loss terms similar to those discussed with reference to FIG. 2A may be included for compare the image frames output by the model decoder network 206 with the renders 212.

The training of the first path and the second path through the encoder-decoder network 200, as described with reference to FIGS. 2A and 2B respectively, may be performed sequentially or in an interleaved fashion, for example by alternating between the training routines of FIGS. 2A and 2B after every training iteration or every few training iterations. In this way, the encoder network 202 may be encouraged to learn representations of facial expressions based on common features or characteristics of the target face and the synthetic face model.

Figure 3:
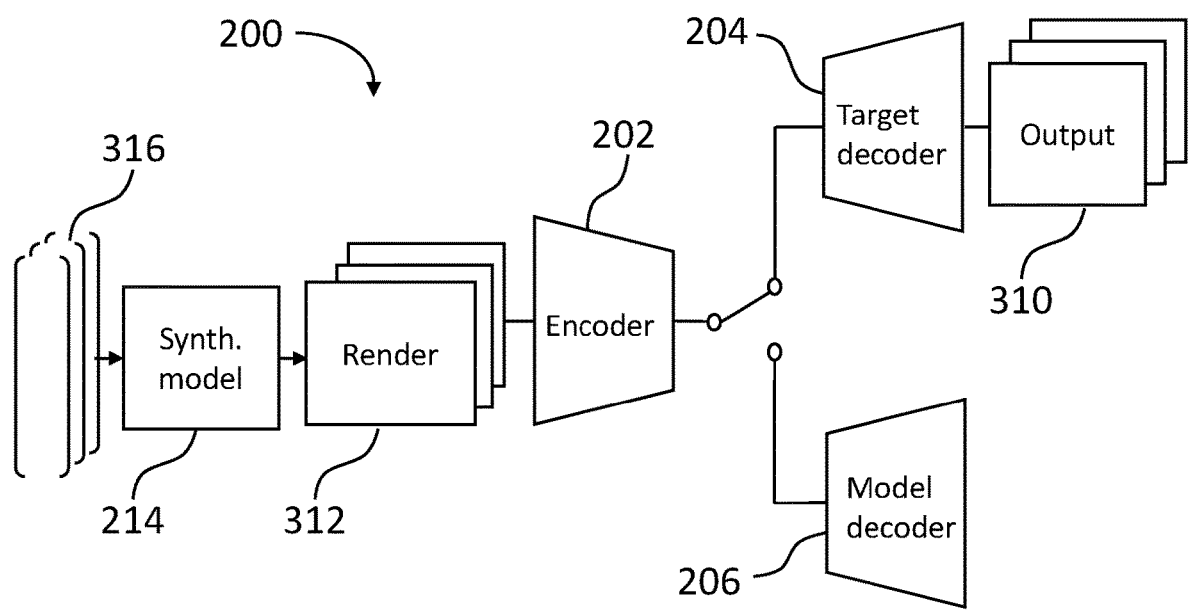
FIG. 3 shows schematically use of the first encoder-decoder network generate output video data.

FIG. 3 shows an example in which, following the training described above with reference to FIGS. 2A and 2B, the first path through the encoder-decoder network 200 is used to process source data representing the synthetic face model 214 exhibiting a source sequence of expressions, to generate output video data 310. In this example, the source data includes a render 312 of the synthetic face model exhibiting the source sequence of expressions. The render 312 may be generated by rendering the synthetic face model 214 with a corresponding set of parameter values 316. Because the encoder network 202 has been trained to generate representation of facial expressions based on common features of the target face and the synthetic face model, the encoder network 202 generates latent data arrays which are capable of being decoded by either one of the target decoder network 204 and the model decoder network 206, irrespective of whether the latent data arrays are derived from footage of the target face or renders of the synthetic face model 214. Accordingly, the output video data 310 shows the target face exhibiting the source sequence of expressions. In this way, the trained encoder network 202 and target decoder network 204 are used to transpose expressions of the synthetic face model 214 to the target face.

The target face appearing in the output video data 310 will typically exhibit poses corresponding to those of the source data, because during training the target decoder network 204 learns to decode poses from the latent data arrays generated by the encoder 202. An exception to this may occur if the target footage 208 used to train the target decoder network 204 only exhibits a single pose or a very narrow range of poses. In this case, the target decoder network 204 may learn to ignore pose information within the latent data array, and instead mimic the pose of the target face appearing in the target footage 208. This may reduce a level of control over the resulting output video data 310, but may be convenient for example if part of the output video data 310 is used to replace part of the target footage 208.

Figure 4:
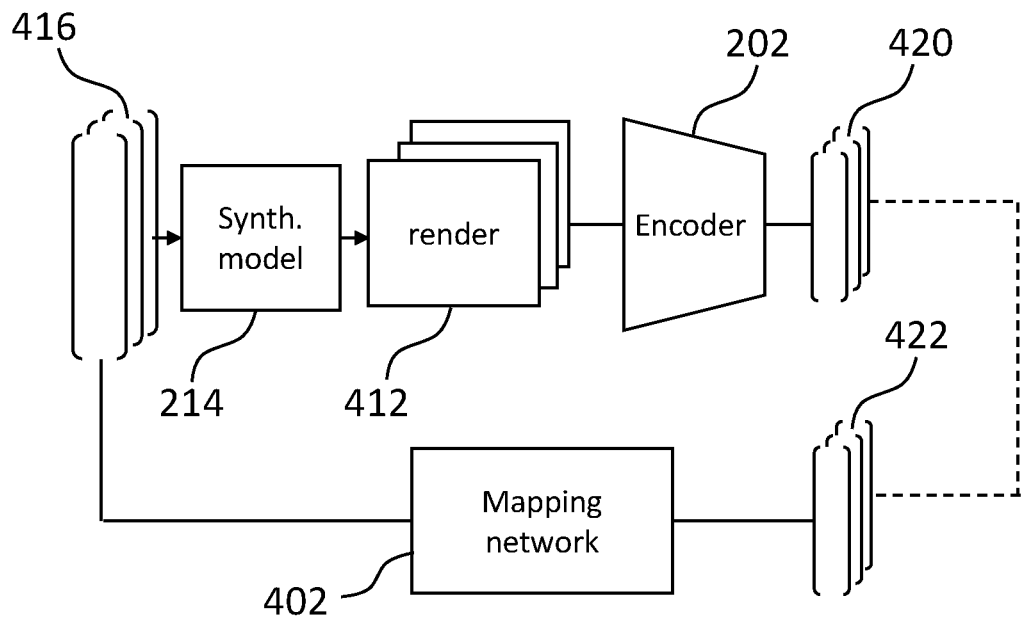
FIG. 4 shows schematically an example of training a mapping network.

In the example of FIG. 3, the trained encoder network 202 is used directly when generating the output video data 310. In other examples, the trained encoder network 202 may instead be used to train a further neural network for generating output video data. FIG. 4 shows an example in which a mapping network 402 is trained to map sets of parameter values 416 for the synthetic face model to corresponding latent data arrays 420 as generated by the encoder network 202. The mapping network may have any suitable architecture for mapping the parameter values 416 to the latent data arrays 420, for example comprising multiple fully connected layers. Depending on the configuration of the encoder network 202, the mapping network 402 may be trained to map multiple sets of parameter values for the synthetic face model to a single latent data array, or to map a single set of parameter values for the synthetic face model to a single latent data array.

In the example of FIG. 4, renders 412 of the synthetic face model 214 are generated using the sets of parameter values 416. The generated renders 412 are processed using the trained encoder network 202 to generate latent data arrays 420. The sets of parameter values 416 are also processed using the mapping network 402 to generate candidate reconstructions 422 of the latent data arrays 420. A mapping loss is determined, for example based on an L1 loss, and L2 loss, or any other suitable metric for measuring a distance between the ground truth latent data arrays 420 and the candidate reconstructions 422. Backpropagation is used to determine a gradient of the mapping loss with respect to parameters of the mapping network 402, and the mapping network 402 may be updated in dependence on the determined gradient of the mapping loss, for example using stochastic gradient descent or a variant thereof.

Figure 5:
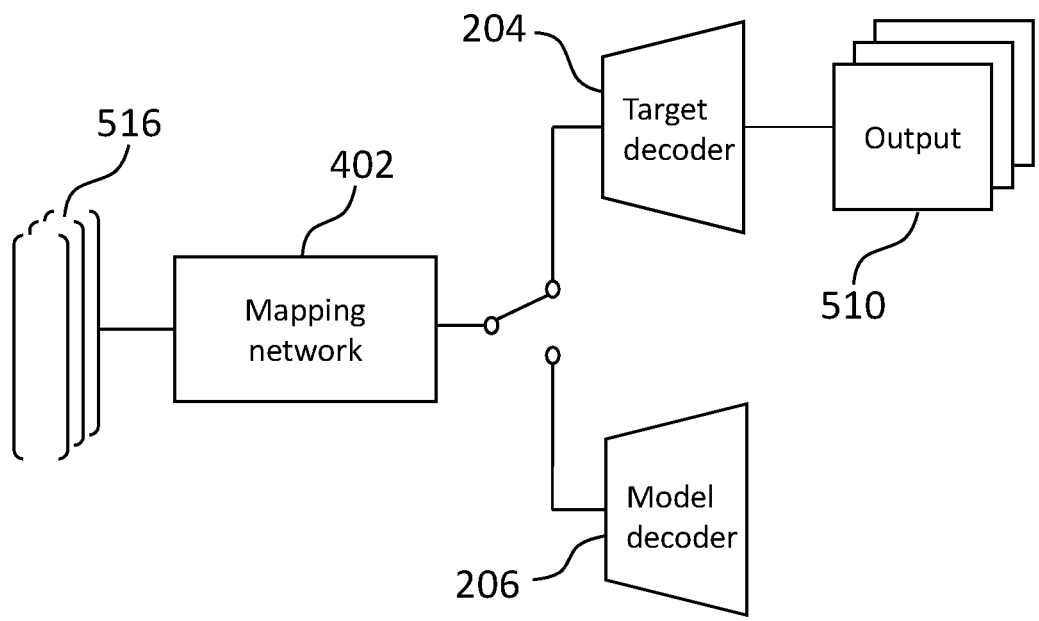
FIG. 5 shows schematically use of the mapping network to generate output video data.

Once the mapping network 402 has been trained, the synthetic face model 214 and trained encoder network 202 appearing in FIG. 3 may be replaced with the trained mapping network 402, as shown in FIG. 5, to generate output video data 510 in which the target face exhibits a source sequence of expressions, based on sets of parameter values 516 representing the source sequence of expressions. This implementation provides direct control over facial expressions exhibited by the target face via the parameter values of the synthetic face model, without the need to render the synthetic face model. An alternative method of training the mapping network 402 is to couple the mapping network 402 to the trained model decoder 206, and to train the resulting network path to reconstruct sets of parameter values for the synthetic model (whilst freezing the parameter values of the trained model decoder 206).

Figure 6A:
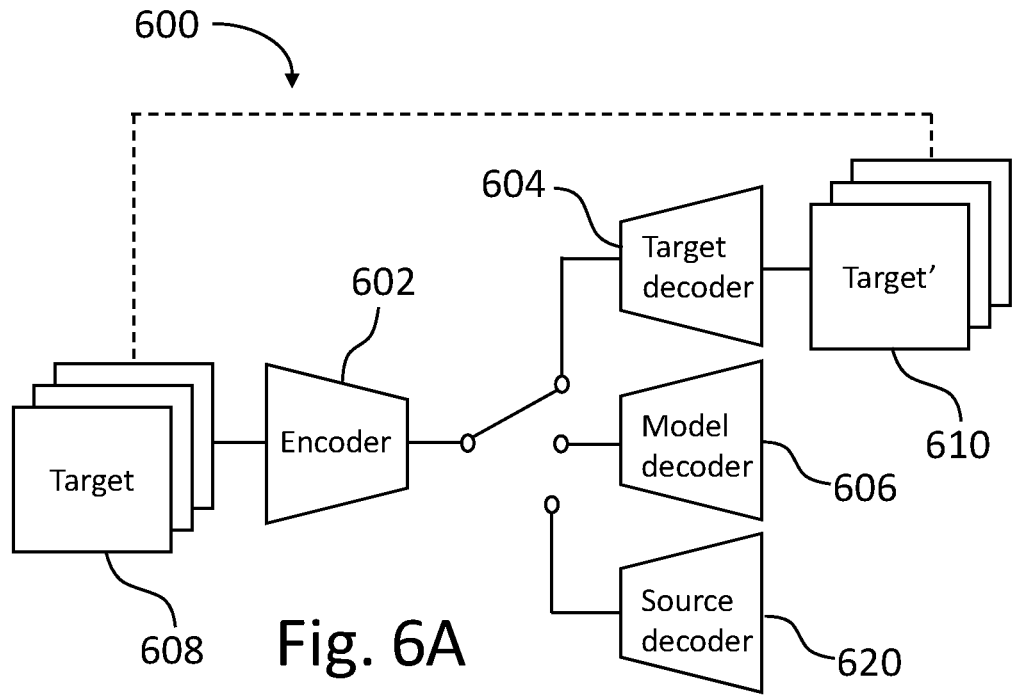
FIGS. 6A-6C show schematically an example of training a second encoder-decoder network.
Figure 6B:
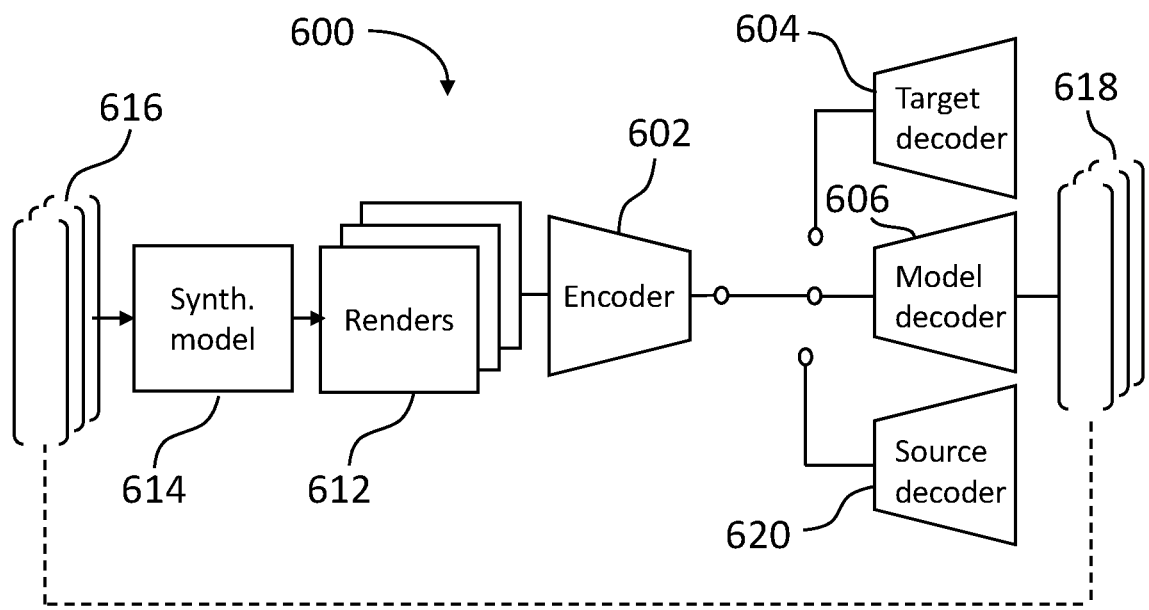
Figure 6C:
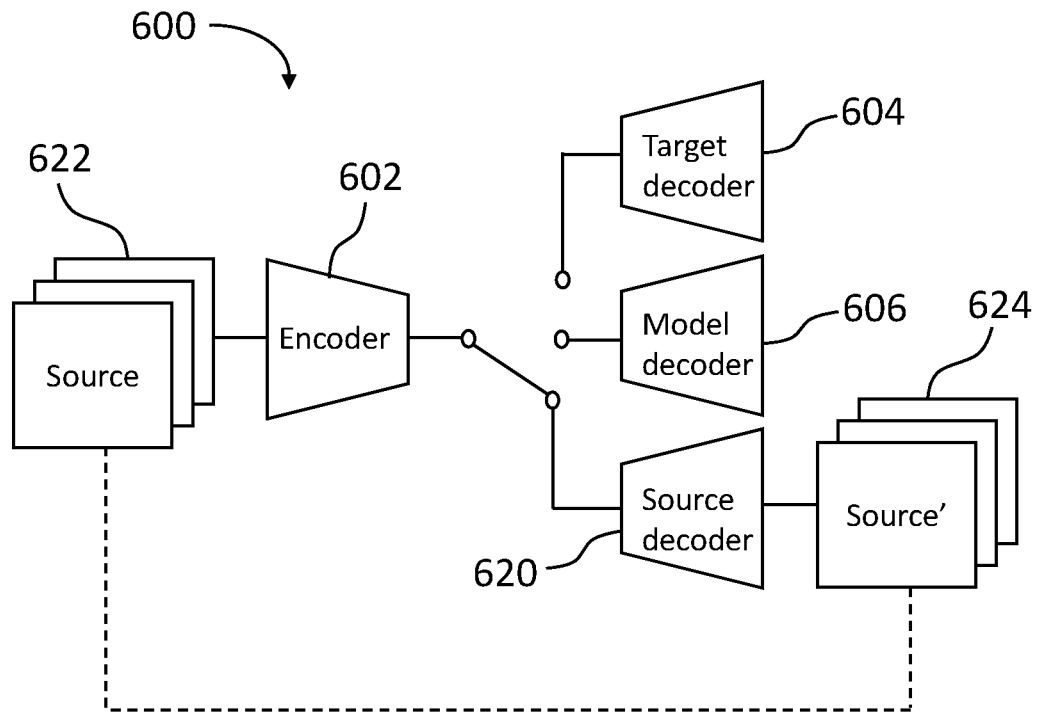

The methods described above with reference to FIGS. 2-5 enable facial expressions to be transposed from a controllable synthetic model to a target human face. In order for such methods to be used for the visual dubbing of films, it may also be desirable to be able to animate the synthetic model in dependence on source footage of a source human face, for example footage of a secondary language actor. FIGS. 6A-6C show an example of an augmented encoder-decoder network 600 which is identical to the encoder-decoder network 200, but with the addition of a source decoder network 620. The source decoder network 620 may be any suitable neural network model capable of generating image frames from latent data arrays, and may have an identical architecture to the target decoder network 604 (though this is not essential).

As shown in FIGS. 6A and 6B, the augmented encoder-decoder network 600 includes first and second network paths corresponding to the first and second network paths shown in FIGS. 2A and 2B. In this example, the first and second paths through the encoder-decoder network 600 are trained as described with reference to FIGS. 2A and 2B. Furthermore, as shown in FIG. 6C, a third path through the augmented encoder-decoder network 600 (comprising the encoder network 602 and the source decoder network 620) is trained to reconstruct footage 622 of a source human face. The footage 622 may include several minutes of footage, for example 5-10 minutes of footage, for example footage of a secondary language actor speaking in a recording booth or similar setting. The footage 622 may show a frontal view of the source human face, which is likely to be possible given the controlled environment in which the footage is obtained, though this is not essential. The training of the third network path may proceed in a similar manner to the training of the first network path. In particular, the footage 622 may be processed using the third network path to generate candidate reconstructions 624 of the footage 622, from which one or more losses may be determined (such as adversarial, photometric or perceptual losses) and used to train the third network path.

The training of the first, second and third paths through the augmented encoder-decoder network 600, may be performed sequentially or in an interleaved fashion, for example by cycling between the training routines of FIGS. 6A-6C after every training iteration or every few training iterations. In this way, the encoder network 602 may be encouraged to learn representations of facial expressions based on common features or characteristics of the target face, the source face, and the synthetic face model.

Figure 7:
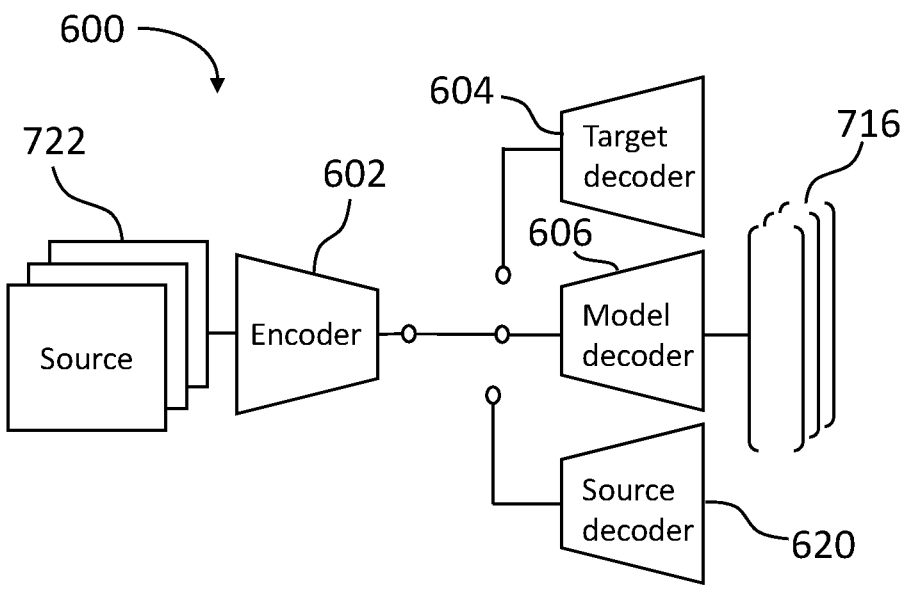
FIG. 7 shows schematically use of the second encoder-decoder network to determine parameter values for a synthetic face model.

FIG. 7 shows an example in which, following the training of the encoder-decoder network 600, the second path through the encoder-decoder network 600 (comprising the encoder network 602 and the model decoder 606) is used to process source footage 722 of the source human face, to generate sets of parameter values 716 for the synthetic face model 614. The source footage 722 may be a subset of the footage 622 used to train the third path through the encoder-decoder network 600, though this is not essential. The source footage 700 may for example be footage of a secondary language actor performing lines for a specific scene of a film. Because the encoder network 602 has been trained to generate representation of facial expressions based on common features of the target face, the source face, and the synthetic face model, the encoder network 602 generates latent data arrays which are capable of being decoded by any one of the target decoder network 604, the model decoder network 606, and the source decoder network 620, irrespective of whether the latent data arrays are derived from footage of the target face or source face, or renders of the synthetic face model 614. Accordingly, the generated sets of parameter values 716 correspond to the sequence of expressions exhibited by the source human face in the source footage 722. In this way, the trained encoder network 602 and model decoder network 606 are used to transpose expressions from the source face to the synthetic face model 614.

Figure 8:
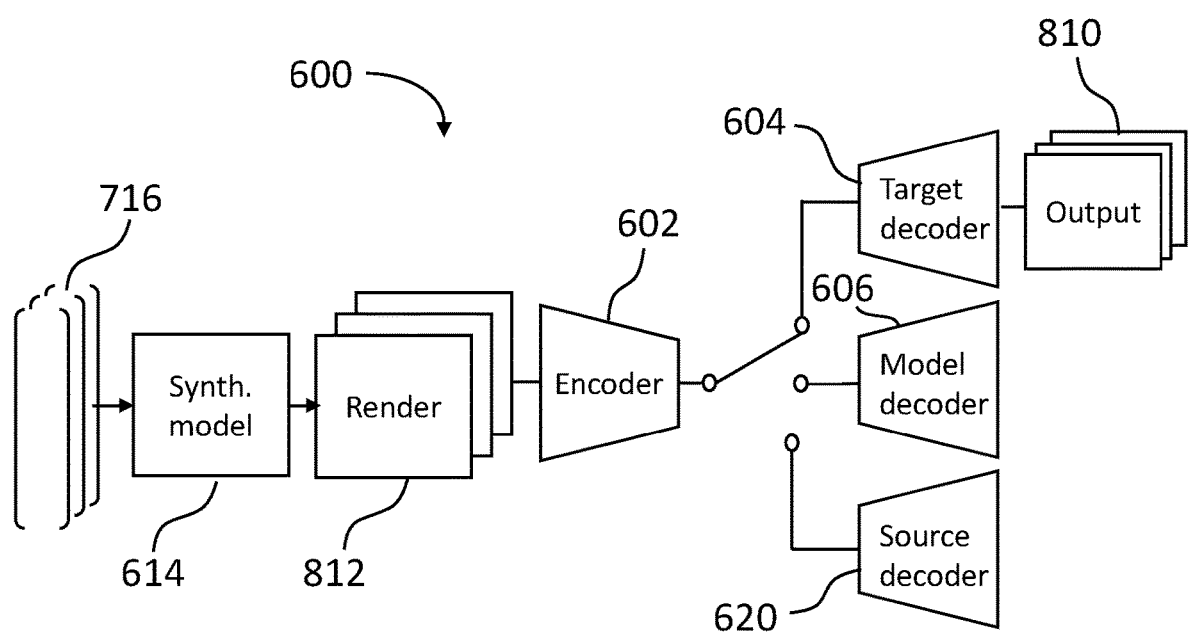
FIG. 8 shows schematically use of the second encoder-decoder network to generate output video data.
Figure 9A:
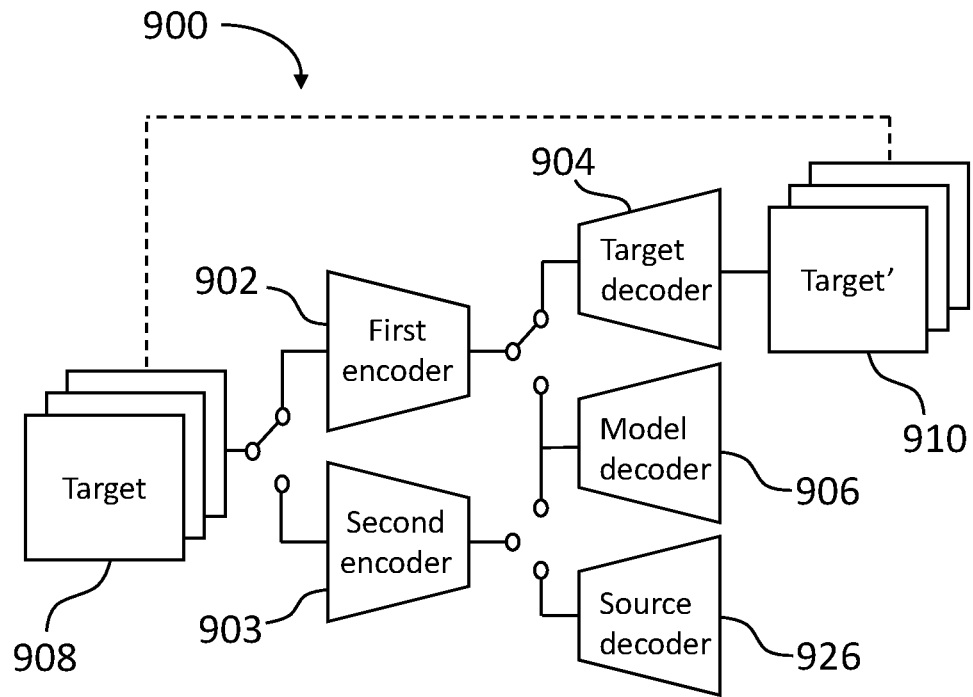
FIGS. 9A-9D show schematically an example of training a third encoder-decoder network.
Figure 9B:
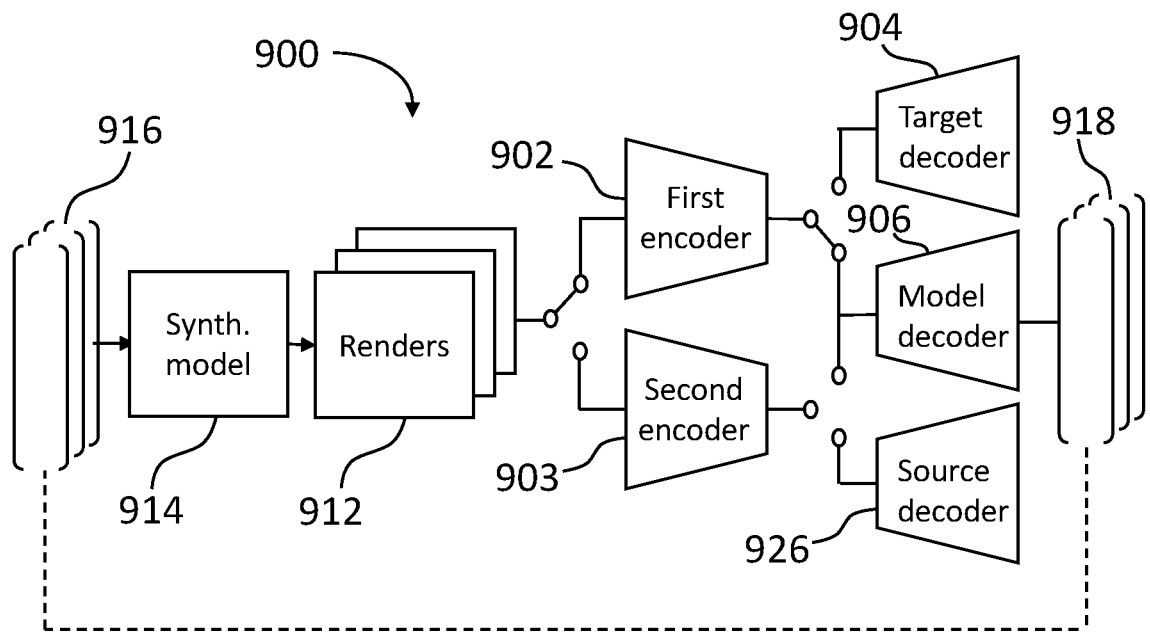
Figure 9C:
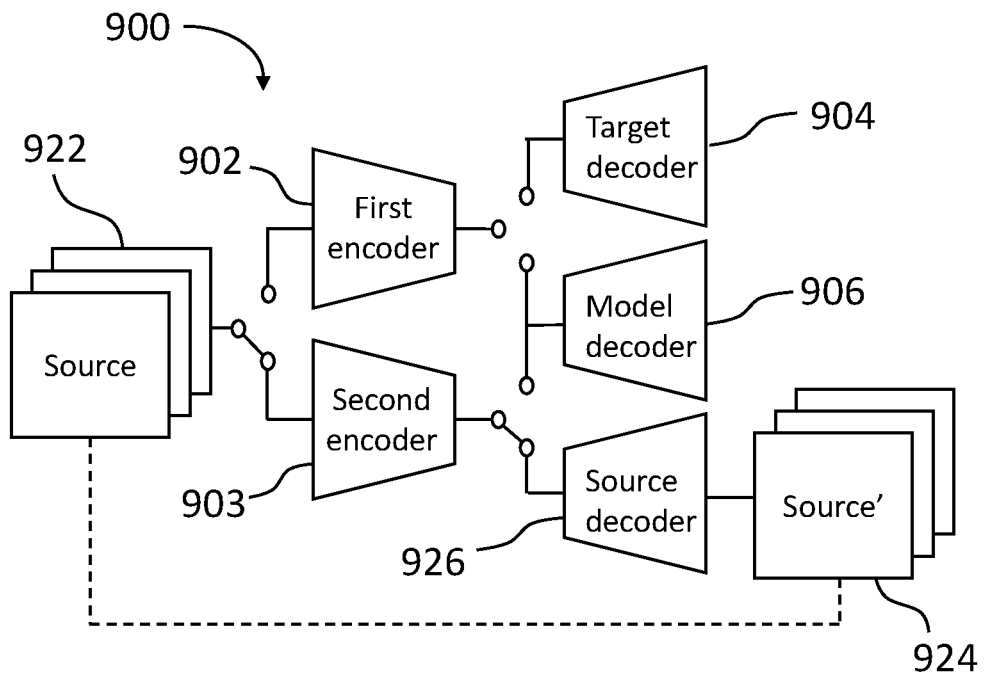
Figure 9D:
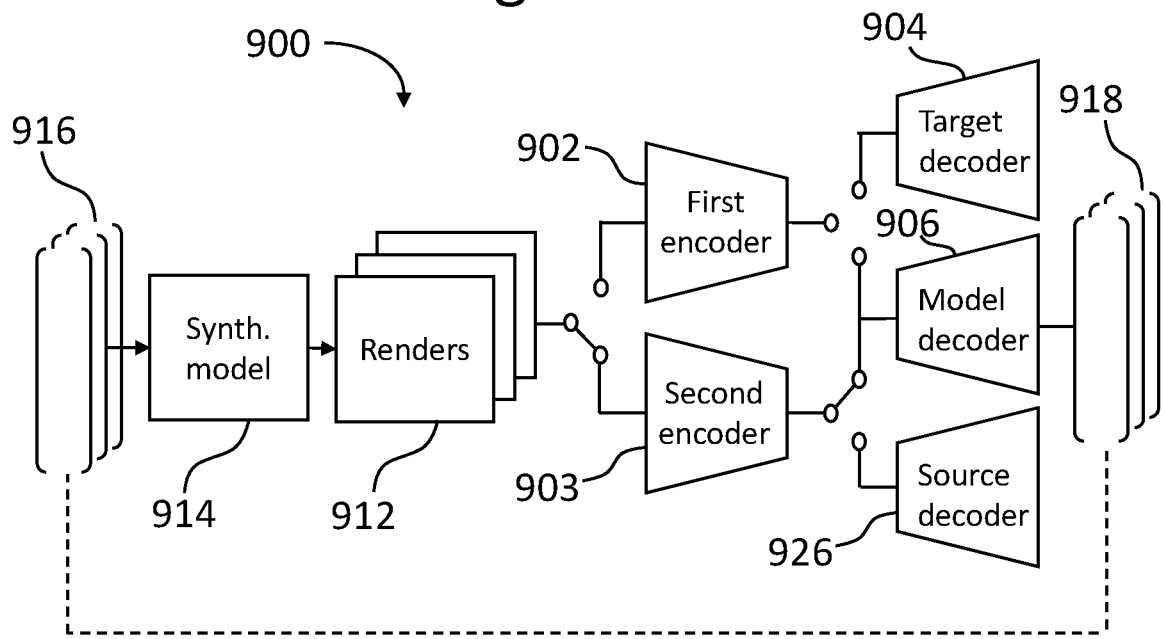

When the sets of parameter values 716 corresponding to the source human face have been generated, they may be processed using the first path through the encoder-decoder network 600, as shown in FIG. 8, to generate output video data 810 in which the target human face exhibits the same sequence of expressions as the source face in the source footage 722.

Figure 10:
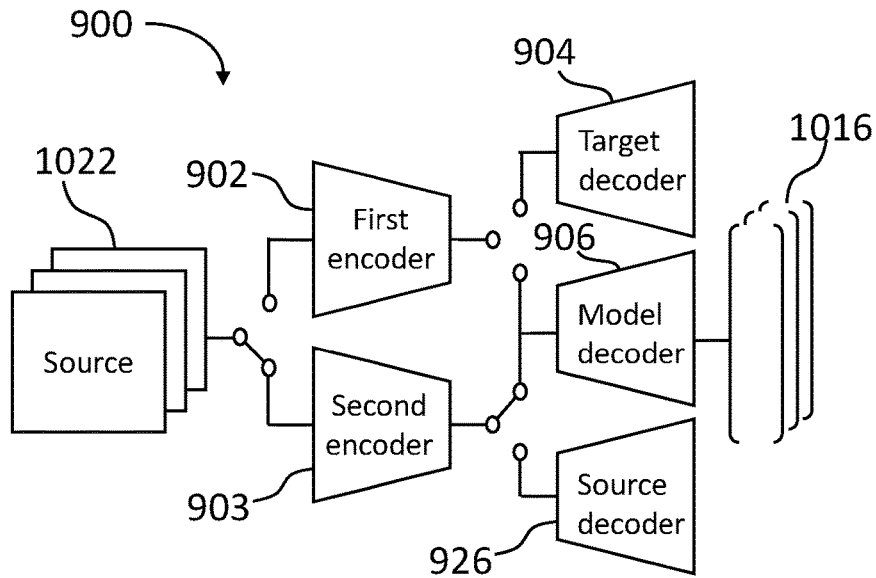
FIG. 10 shows schematically use of the third encoder-decoder network to determine parameter values for a synthetic face model.
Figure 11:
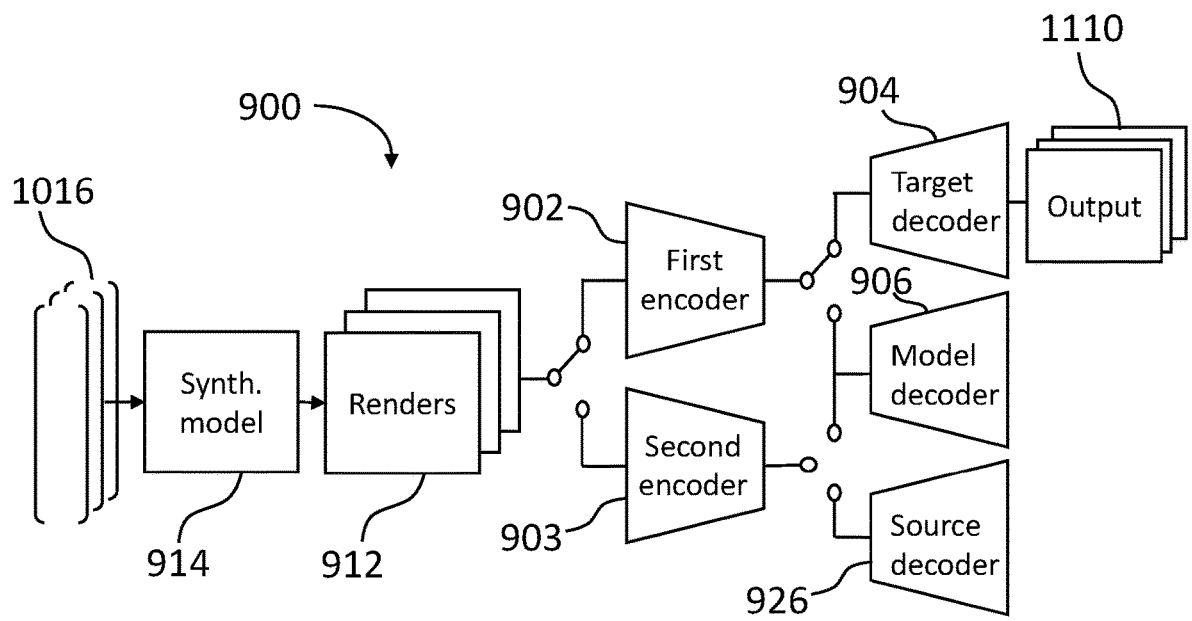
FIG. 11 shows schematically use of the third encoder-decoder network to generate output video data.

FIGS. 9-11 show an alternative encoder-decoder network 900 providing similar functionality to the encoder-decoder network 600 of FIGS. 6-8. The main difference is that whereas the encoder-decoder network 600 used a common encoder network 602 to transpose expressions between the target human face and the synthetic face model, and between the source human face and the synthetic face model, the encoder-decoder network 900 instead uses a first encoder network 902 to transpose expressions between the target human face and the synthetic face model, and uses a second encoder network 903 to transpose expressions between the source human face and the synthetic face model. Such an implementation may reduce the difficulty of the task posed for each encoder network, since each encoder network only has to identify common features between a single human face and the synthetic face model, rather than having to identify common features between two human faces and the synthetic face model. On the other hand, forcing an encoder network to work with several human faces may be beneficial in forcing the encoder network to represent expressions in a more generic manner. The relative efficacy of the two implementations is likely to depend on the specific architectures of the encoder networks and decoder networks, and also whether a synthetic face model can be obtained which is visually similar to either the source human face or the target human face.

A method of training the encoder-decoder network 900 is shown in FIGS. 9A-9D. The method is substantially similar to that described above with reference to FIGS. 6A-6C, but an additional stage is required as both encoder networks 902, 903 need to be trained to process renders 912 of a synthetic face model 914 exhibiting a range of poses and expressions to determine corresponding sets of parameter values 916 for the synthetic face model 914.

FIG. 10 shows a method in which the trained encoder-decoder network 900 is used to process source footage 1022 to generate sets of parameter values 1016 for the synthetic face model 914. The method of FIG. 10 substantially corresponds to the method described above with reference to FIG. 7, using a network path comprising the second encoder network 903 and the model decoder network 906.

FIG. 11 shows a method in which the trained encoder-decoder network 900 is used to generate output video data 1110 in which the target human face exhibits the same sequence of expressions as the source face in the source footage 1022. The method of FIG. 11 substantially corresponds to the method described above with reference to FIG. 8, using a network path comprising the first encoder network 902 and the target decoder network 904.

Using the methods described above, sequences of facial expressions (for example corresponding to lines of dialogue) may be automatically transposed from a source actor to a target actor. However, one of the benefits of these methods over two-dimensional methods is the ability to tweak or modify the resulting output video data via the adjustable parameters of the synthetic face model. Accordingly, in some examples the methods described herein may be augmented to determine intermediate parameter values representing an intermediate sequence of expressions, which are then manually or automatically adjusted before being used to generate output video data. Adjusting the intermediate parameter values may for example include progressively interpolating between the intermediate parameter values and parameter values corresponding to the target footage of the target human face (which may be determined by processing the target footage using a second path through the encoder-decoder network in a similar manner to that described with reference to FIG. 7 or 10). The target face may then be made to progressively transition between the original expressions and the intermediate expressions in a smooth and seamless fashion. Furthermore, the deviation of the original expressions can be ramped up and down to enable continuous deep editing. It may for example be appropriate to use the intermediate parameter values only when the source human face is speaking, in order to avoid irrelevant facial expressions of the source human face appearing in the processed video data, and to progressively transition back to the original parameter values when the source human face is not speaking.

Adjusting the intermediate parameter values may include modifying the parameter values corresponding to the target footage of the target human face to reduce an amplitude of mouth movement of the target human face when it is determined that the target human face is speaking (either manually or automatically based on the target footage or an associated audio track). In the context of visual dubbing, mouth movements of the primary language actor may for example be suppressed when the primary language actor is speaking but the secondary language actor is not speaking. Additionally, or alternatively, adjusting the intermediate parameter values may include modifying a mouth shape of the synthetic face model to match a plosive or bilabial consonant in the source footage. Incorrect mouth shapes during plosives or bilabial consonants may be particularly easy for a viewer to detect, and therefore precise control of the synthetic face model at these moments may be advantageous.

The process of transposing the expressions of the source actor onto the target actor may be integrated within a visual dubbing pipeline, for example by (i) processing input video data using a face detector/tracker to detect instances of the target human face (along with possibly other target human faces to be dubbed), (ii) determining a framewise location (and optionally, size) of each of the detected instances of the target human face, (iii) isolating the target footage from the input video data based on the determined framewise locations of the detected instances of the target human face (e.g. by extracting portions of image frames lying within boxes at the determined framewise locations, possibly including stabilizing, registration, and/or color normalization), (iv) for a first instance of the target human face, using the methods described herein to generate output video data comprising a corresponding dubbed instance of the target human face, and (v) replacing at least part of the first instance of the target human face in the input video data with at least part of the dubbed instance of the target human face.

The replacing stage (v) may be achieved by compositing part of the dubbed instance of the target face with the input video data, where the compositing process may involve overlaying part of the output video data onto the input video data using the metadata stored in association with the first instance of the target human face. Any stabilizing, registration, or color normalization applied during the isolation stage (iv) may be reversed/inverted before the overlaying takes place. A soft mask (alpha matte) may be applied to the dubbed instance of the target face which is to be overlaid (for example, a lower region of the target face including the mouth and excluding the eyes) to achieve a gradual blend between the replaced part and the underlying image frames. The mask may be generated based on the synthetic face model, resulting in a mask which adheres to the synthetic face model, and only needs to be defined once for a given target face or for a given instance of a target face. In some examples, noise may be applied to the output video data to match digital noise or grain appearing in the input video data (which may otherwise not appear in the output video data). For example, Perlin noise may be applied with a scale and intensity to match any digital noise appearing within the input video data.

In order to facilitate precise and seamless replacement of the first instance of the target face, the synthetic face model may be used to generate first mask data indicating the framewise shape of the first instance to be replaced (or a portion thereof) and second mask data indicating the framewise shape of the dubbed instance (or a portion thereof). The replacement stage may then involve comparing the first mask data and the second mask data to determine whether a boundary of the first instance exceeds a boundary of the dubbed instance for any of the image frames in which the first instance is to be replaced. This may occur, for example, if the first instance of the target face has an open mouth when the dubbed instance of the target face has a closed mouth. Parts of the first instance may then be visible even after the overlaying of the dubbed instance. In such cases, clean background generation may be performed to replace traces of the first instance with appropriate backgrounds, for example using visual effects tools such as Mocha Pro by Boris FX® or through the application deep inpainting techniques.

Figure 12:
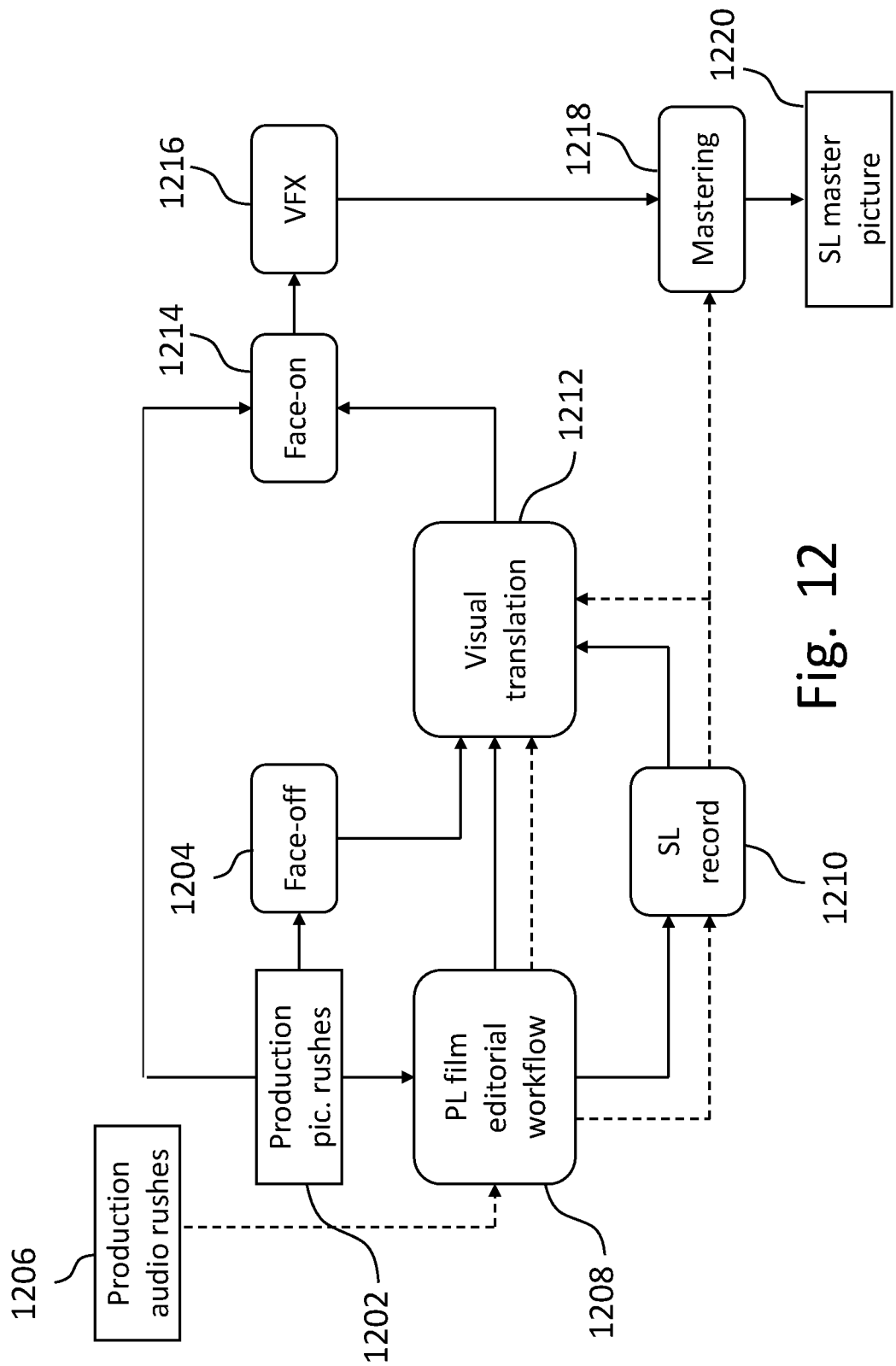
FIG. 12 shows schematically a filmmaking pipeline for a foreign language version of a film including visual dubbing, in accordance with examples.

FIG. 12 shows a filmmaking pipeline for a foreign language version of a film in which visual dubbing is performed in accordance with the methods described herein. The solid arrows represent paths of video data whereas the dashed arrows represent paths of audio data. In this example, production picture rushes 1202 undergo a face-off process 1204 in which instances of actors' faces are detected and isolated (possibly at reduced resolution). The production picture rushes 1202 and associated production audio rushes 1206 are used in the primary language (PL) editorial workflow 1208, which includes an offline edit in which footage from the production picture rushes is selected for the final film. The resulting offline edit (picture and audio) are used to guide secondary language (SL) recording 1210, which may involve multiple secondary language actors recording secondary language audio for multiple primary language actors and/or in multiple secondary languages. In this example, the SL recording 1210 includes video recording and audio recording. In other examples, SL recording may only involve audio recording. The offline edit may further be used to determine which instances of the primary language actors' faces need to be translated.

The video and/or audio data resulting from the SL recording 1210 is used as source footage for visual translation 1212, in which the methods described herein are used to generate dubbed instances of the primary language actors' faces. In this example, the production picture rushes 1202 are used to provide large volumes of target footage to train encoder-decoder networks as described above. The resulting dubbed instances undergo a face-on process 1214 in which the dubbed instances are combined with the full-resolution master picture. VFX 1216 are then applied if necessary, followed by mastering 1218 of the full-resolution master picture and the secondary language audio, in order to create the final secondary language master picture 1220 for delivery.

The above embodiments are to be understood as illustrative examples of the invention. Further embodiments of the invention are envisaged. For example, a generic encoder network may be trained with separate decoders corresponding to many different actors and a synthetic face model, which may result in a trained encoder network capable of representations based on generic features of human faces. Such an encoder network may be used "off the shelf" with new decoders, reducing the training cost associated with dubbing a new target actor. Furthermore, the methods described herein may be used for deep editing of objects other than human faces, for example whole humans, animals, vehicles, and so on.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A computer-implemented method of processing input video data comprising target footage of a target human face, comprising:
    training an encoder-decoder network comprising an encoder network, a first decoder network, and a second decoder network, the training comprising:
        training a first path through the encoder-decoder network to reconstruct the target footage of the target human face, the first path comprising the encoder network and the first decoder network; and
        training a second path through the encoder-decoder network to process renders of a synthetic face model exhibiting a range of poses and expressions to determine parameter values for the synthetic face model corresponding to the range of poses and expressions, the second path comprising the encoder network and the second decoder network; and
    processing, using a trained network path comprising or trained using the encoder network and comprising the first decoder network, source data representing the synthetic face model exhibiting a source sequence of expressions, to generate output video data in which the target human face exhibits the source sequence of expressions.

2. The computer-implemented method of claim 1, wherein:
    the source data comprises a render of the synthetic face model exhibiting the source sequence of expressions; and
    the trained network path is the trained first path through the encoder-decoder network.

3. The computer-implemented method of claim 1, wherein:
    the method comprises training a mapping network to map sets of parameter values for the synthetic face model to data arrays generated by the encoder network processing corresponding footage of the synthetic face model;
    the source data comprises a set of parameter values for the synthetic face model corresponding to the source sequence of expressions; and
    the trained network path comprises the mapping network and the first decoder network.

4. The computer-implemented method of claim 1, comprising processing source footage of a source human face to generate the source data.

5. The computer-implemented method of claim 4, wherein:
    the encoder-decoder network comprises a third decoder network;
    the training comprises training a third path through the encoder-decoder network to reconstruct footage of the source human face, the third path comprising the encoder network and the third decoder network; and
    processing the source footage uses the trained second path through the encoder-decoder network.

6. The computer-implemented method of claim 4, wherein:
    the encoder network is a first encoder network;
    the encoder-decoder network comprises a second encoder network and a third decoder network; and
    the training includes:
        training a third path through the encoder-decoder network to reconstruct footage of the source human face, the third path comprising the second encoder network and the third decoder network; and
        training a fourth path through the encoder-decoder network to reconstruct footage of the synthetic face model exhibiting a range of poses and expressions, the fourth path comprising the second encoder network and the second decoder network; and
    processing the source footage of the source human face uses the trained fourth path through the encoder-decoder network.

7. The computer-implemented method of claim 4, wherein generating the source data comprises:
    processing the source footage of the source human face to determine intermediate parameter values for the synthetic face model representing an intermediate sequence of expressions; and
    adjusting the intermediate parameter values to generate the source data.

8. The computer-implemented method of claim 7, wherein adjusting the intermediate parameter values comprises progressively interpolating between the intermediate parameter values and target parameter values corresponding to the target footage of the target human face.

9. The computer-implemented method of claim 4, wherein the target footage represents a first actor speaking in a first language and the source footage represents a second actor speaking in a second language different from the first language.

10. The computer-implemented method of claim 1, comprising obtaining the footage of the synthetic face model exhibiting the range of poses and expressions by rendering the synthetic face model based on the parameter values corresponding to the range of poses and expressions.

11. The computer-implemented method of claim 10, comprising sampling the range of poses and expressions based on a predetermined space-filling design to cover a parameter space for the poses and expressions of the synthetic face model.

12. The computer-implemented method of claim 1, wherein training the first path through the encoder-decoder network uses an adversarial loss and a video reconstruction loss.

13. The computer-implemented method of claim 1, wherein training the second path through the encoder-decoder network uses a parameter reconstruction loss.

14. The computer-implemented method of claim 1, comprising:
processing the input video data using a face detector to detect instances of the target human face;
determining a framewise location of each of the detected instances of the target human face; and
isolating the target footage from the input video data based on the determined framewise locations of the detected instances of the target human face.

15. The computer-implemented method of claim 14, comprising replacing at least part of a first instance of the target human face detected in the input video data with at least part of the target human face appearing in the output video data.

16. The computer-implemented method of claim 15, wherein said at least part of the target human face includes a mouth and excludes eyes.

17. A system comprising one or more processors and one or more non-transient storage media storing machine readable instructions which, when executed by the one or more processors, cause the one or more processors to carry out a method comprising:
training an encoder-decoder network comprising an encoder network, a first decoder network, and a second decoder network, the training comprising:
training a first path through the encoder-decoder network to reconstruct the target footage of the target human face, the first path comprising the encoder network and the first decoder network; and
training a second path through the encoder-decoder network to process renders of a synthetic face model exhibiting a range of poses and expressions to determine parameter values for the synthetic face model corresponding to the range of poses and expressions, the second path comprising the encoder network and the second decoder network; and
processing, using a trained network path comprising or trained using the encoder network and comprising the first decoder network, source data representing the synthetic face model exhibiting a source sequence of expressions, to generate output video data in which the target human face exhibits the source sequence of expressions.

18. One or more non-transient storage media storing machine readable instructions which, when executed by one or more processors, cause the one or more processors to carry out a method comprising:
training an encoder-decoder network comprising an encoder network, a first decoder network, and a second decoder network, the training comprising:
training a first path through the encoder-decoder network to reconstruct the target footage of the target human face, the first path comprising the encoder network and the first decoder network; and
training a second path through the encoder-decoder network to process renders of a synthetic face model exhibiting a range of poses and expressions to determine parameter values for the synthetic face model corresponding to the range of poses and expressions, the second path comprising the encoder network and the second decoder network; and
processing, using a trained network path comprising or trained using the encoder network and comprising the first decoder network, source data representing the synthetic face model exhibiting a source sequence of expressions, to generate output video data in which the target human face exhibits the source sequence of expressions.

* * * * *